United States Patent [19]

Cox

[11] 3,991,889

[45] Nov. 16, 1976

[54] RAILWAY TRANSPORTATING SYSTEM AND APPARATUS THEREFOR

[76] Inventor: Robert E. Cox, 19004 Oxcart Place, Gaithersburg, Md. 20760

[22] Filed: Apr. 15, 1975

[21] Appl. No.: 568,348

[52] U.S. Cl. ............................ 214/38 B; 104/32 R; 105/199 C; 105/200; 105/366 C; 214/38 D; 214/83; 214/516
[51] Int. Cl.² ........................................ B65G 67/02
[58] Field of Search .......... 214/38 B, 38 BA, 38 BB, 214/38 D, 516, 83; 105/157 R, 159, 199 C, 200, 366 C; 104/32 R

[56] References Cited
UNITED STATES PATENTS

| | | | |
|---|---|---|---|
| 740,558 | 10/1903 | Hamilton | 105/157 R |
| 1,830,740 | 11/1931 | Leech et al. | 214/38 B X |
| 2,166,948 | 7/1939 | Fitch | 105/366 C |
| 2,327,135 | 8/1943 | Scott | 214/516 X |
| 2,691,450 | 10/1954 | Rosenbaum | 214/38 D |
| 3,307,718 | 3/1967 | Sjöström | 214/38 B |

*Primary Examiner*—Robert G. Sheridan
*Attorney, Agent, or Firm*—Beveridge, DeGrandi, Kline & Lunsford

[57] ABSTRACT

A railway transportation system for express delivery of cargo anywhere in the system employs standard unit trains operating throughout the system, with the individual cars in the train carrying freight in containerized units which are automatically loaded and/or unloaded at main-line terminals, thereby enabling express, reserve-passenger handling of the freight units. The unit trains are each made up of a fixed number of cars each carrying one of the specially designed containers, with the cars being adapted to automatically unload and load the containers at compatible freight terminals having an unloading station on one side of and adjacent each car of the unit train and a loading station on the opposite side of and adjacent each car when the trains are positioned in the terminal. The terminals and/or trains may incorporate means compensating for slight misalignment of the cars relative to the adjacent loading and/or unloading stations, as well as for slight variations in train length due for example to temperature variations, and in car heights due for example to car load and load distribution variations. The containers are delivered to and picked up from their terminal stations in accordance with a controlled schedule operated on a reservation basis throughout the system.

42 Claims, 17 Drawing Figures

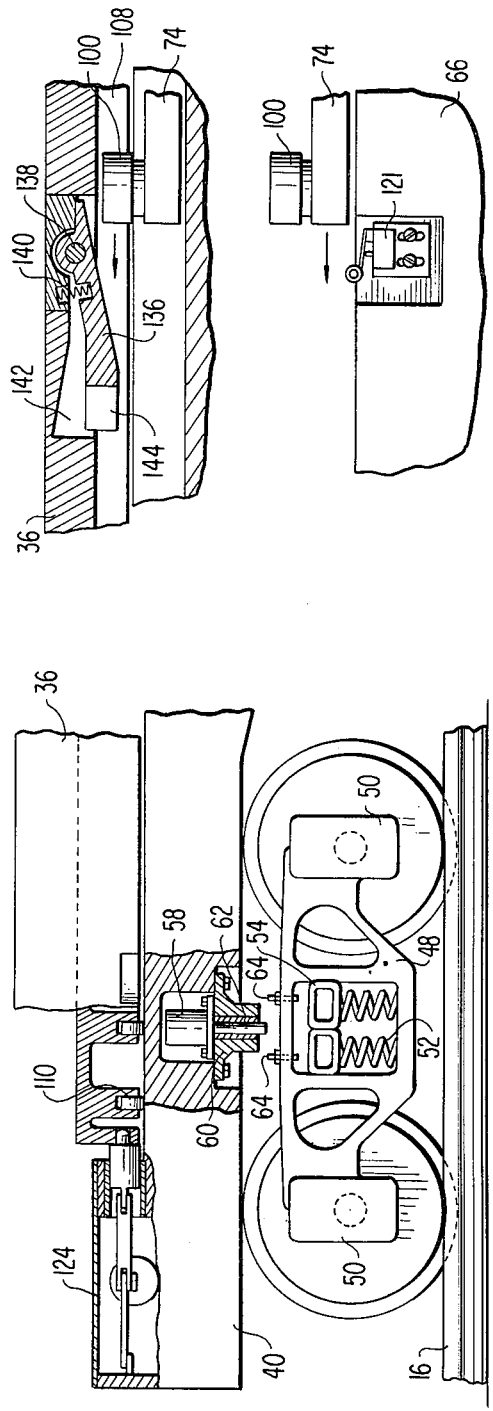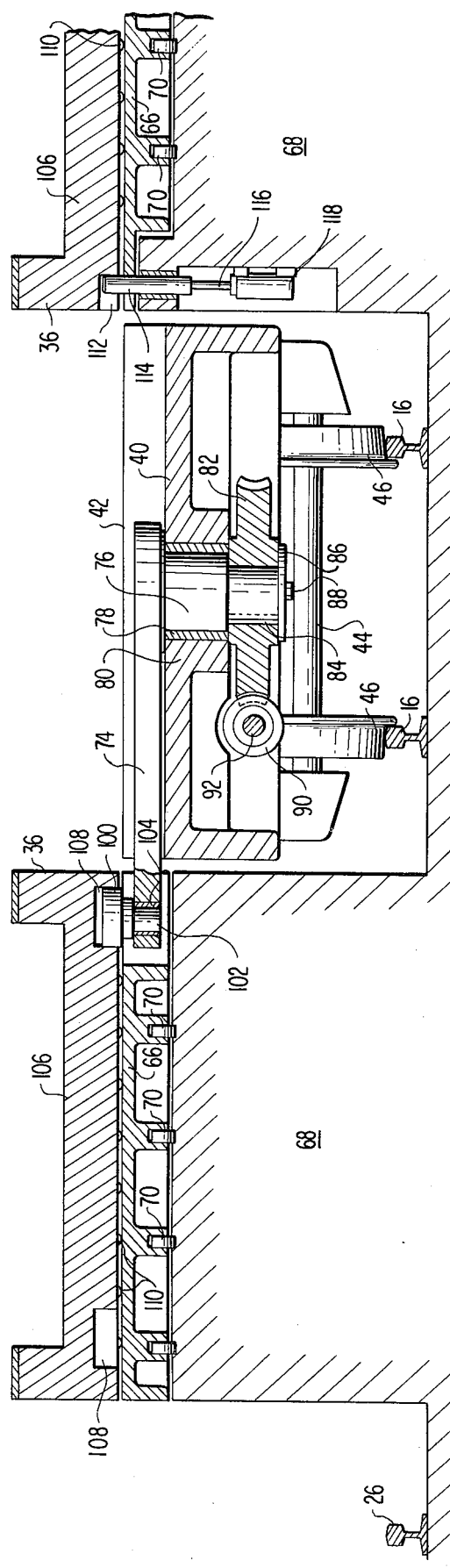

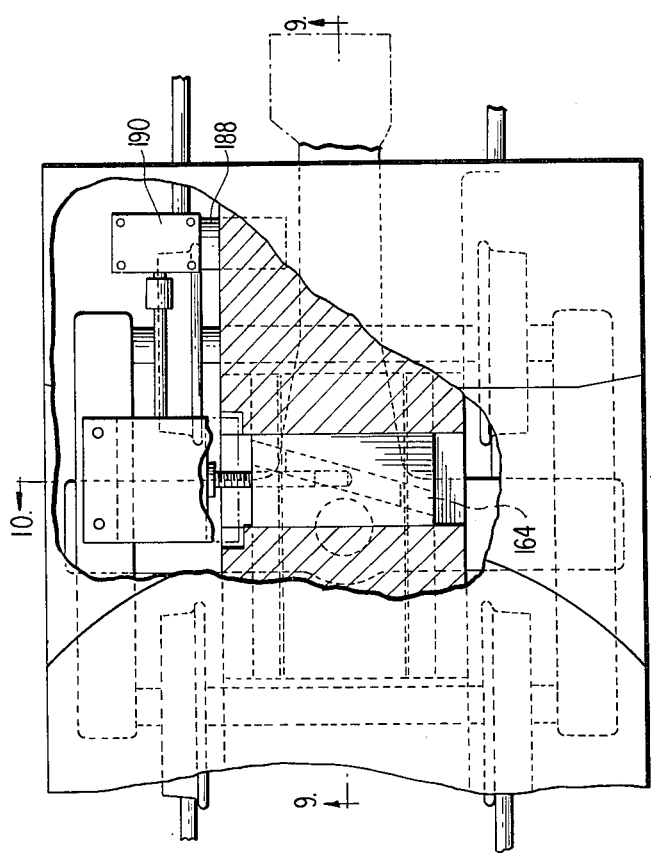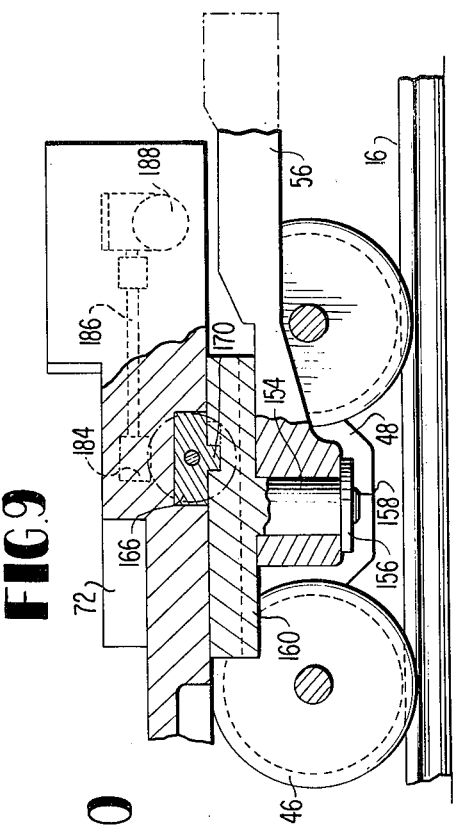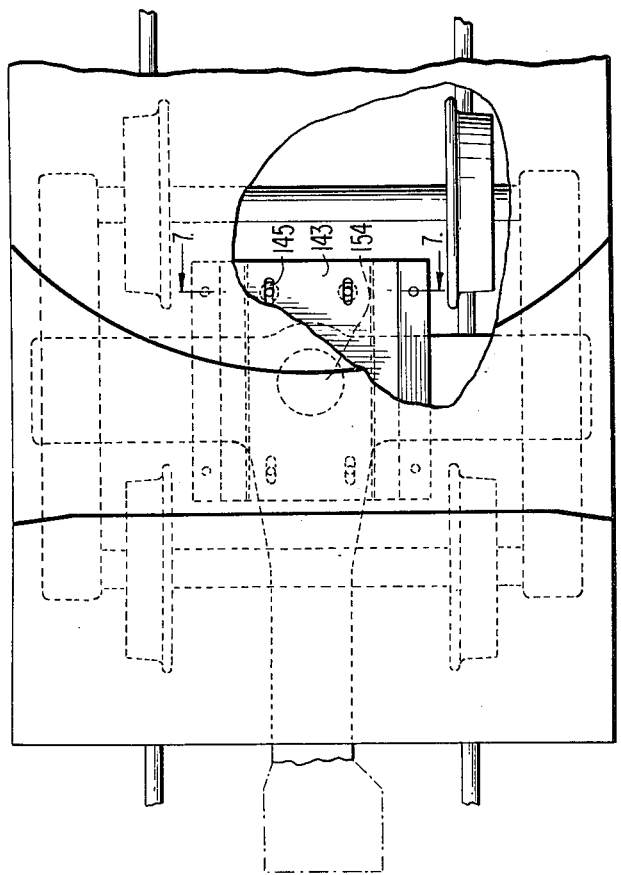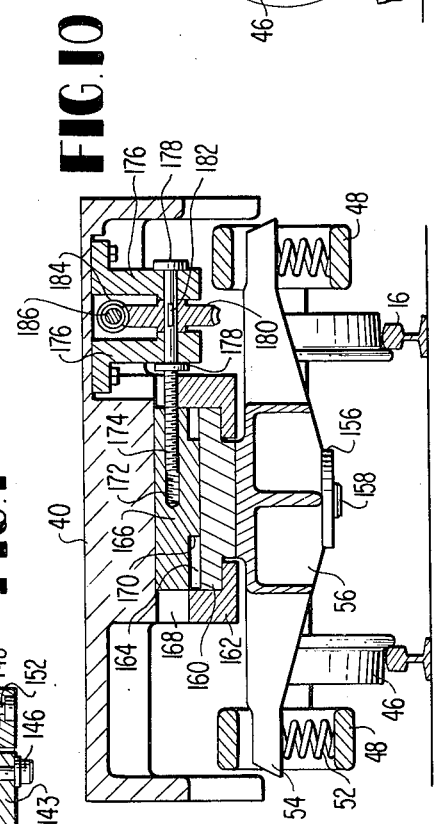

RAILWAY TRANSPORTATING SYSTEM AND APPARATUS THEREFOR

BACKGROUND OF THE INVENTION

1. Field of the Invention

This invention relates to railway transportation systems and equipment, and more particularly to an improved railway transportation system for handling cargo on an express basis by use of unit trains adapted to automatically unload and load containerized freight onto the individual cars of the unit train from unloading and loading stations in compatible terminals.

2. Description of the Prior Art

While numerous improvements in materials, equipment design, communications, and other factors, coupled with a rapidly expanding demand, have resulted in rapid expansion and vast improvement in other forms of transportation in recent years, this has generally not been true of railroad systems, particularly railroad systems within the United States. Indeed, during the period of rapid growth of, for example, highway truck freight transportation, American railroads have experienced a loss of the bulk of their passenger business which, coupled with changes in the freight and bulk material shipping business, has significantly affected the profitability of the rail business. These dramatic changes have resulted in bankruptcy, or near bankruptcy of many of the nation's major railroads, while others have found it necessary to restrict expenditures for capital equipment and maintenance, and to continuously struggle to maintain a solid financial position. As a result, railroad systems generally, and American railroad systems in particular, have remained essentially unchanged for many years during which time the trucking industry has gradually taken a large portion of their freight volume.

The flexibility of the trucking industry has contributed to the dilemma of the railroads in that industrial and commercial expansion has not been restricted to accessibility of rail transportation. Rather, improved highway systems have encouraged the movement of such industry to suburban locations and the attendant advantages such as low land cost, personnel availability, and reduced traffic congestion. Other factors, many of which are directly under the control of the rapidly expanding trucking industry and which have contributed to the problems of the rail industry have included new innovative freight terminal handling equipment and methods, modern systems of highways which has allowed over-the-road shipment to be more cost competitive, reduced damage by truck shipment, better, more personalized service by truck, and others.

The fact that railway systems, particularly in the United States, have developed as integrated systems consisting of a number of interconnecting, independently owned and operated systems has contributed to a large extent in the failure of the industry to develop and adopt the radically new equipment and methods of operation necessary to remain a vehicle, competitive transportation system. Individual improvements which might have slowed the decline of the rail system were difficult to adopt due to the necessity for standardization, coupled with the sheer cost of system-wide changes.

SUMMARY OF THE INVENTION

In order to preserve the railway industry as a viable, competitive, private enterprise system, it is apparent that radical changes must be made in the near future, providing a completely new approach on the national system integrated basis. Major changes including mechanization and automation in material handling methods and equipment must be applied to the rail industry to drastically improve operating efficiencies at a minimum requirement in capital investment. Accordingly, it is a primary purpose of the present invention to provide a comprehensive, automated and mechanized rail system which will enable the rail industry to recapture its share of the cargo transportation business.

Another object of the invention is to provide an improved rail system adapted to treat all freight shipped on the system as a reserve-passage passenger, providing express delivery to any terminal point in the system.

Another object of the invention is to provide a rail system employing unit trains having a fixed number of cars which operate as an express train by limiting the stop time to very short intervals similar to passenger train service, and automatically unloading and loading the cars on a selective basis at the main-line terminals points onto and from compatible terminal unloading and loading stations, thereby eliminating car removals and additions.

Another object of the invention is to provide an improved rail system which will eliminate yard storage to maximize utilization of the cars which are continuously operated in their assigned unit train except for regular maintenance.

Another object is to provide such an improved railway system which will eliminate inter-company use of rail cars, thereby allowing each railroad to maintain maximum control over its own rolling stock.

Another object of the invention is to provide such an improved railway freight system which will allow 100 percent containerization of freight shipped in the system. As used herein, the term "containerization" is understood to include sub-containers, piggy-back vans, bulk containers, and other freight either packed in special standardized containers or mounted upon specially designed and fully standardized pallets adapted for use throughout the system.

Another object of the invention is to provide freight terminals compatible with the unit trains and cooperating with the mechanical loading and unloading mechanism carried on the individual rail cars to permit mechanically loading and unloading the individual cars at the main-line stations to enable express handling of all freight.

Another object of the invention is to provide an improved unit train incorporating a plurality of individual cars of predetermined fixed dimensions and incorporating means for automatically unloading containers therefrom and loading containers thereon.

In the attainment of the foregoing and other objects, an important feature of the invention resides in providing an integrated system employing a unit train concept wherein individual trains are made up of a fixed number of flat cars, each of which includes driven load handling means for automatically unloading a container from the car onto an adjacent unloading station at one side of the car and for loading a container onto the car from a loading station on the opposite side of the car. The loading and unloading stations are located in terminals which are generally referred to herein as main-line terminals to clearly distinguish from the well-known and conventional switching yards, with the terminals having an equal number of loading and unloading stations arranged directly opposite one another on opposed sides of the train and with the spacing of the loading and unloading stations along the train corresponding with the spacing of the individual cars in the train. Thus, by positioning the first car of the train in direct registry with the first loading and unloading platforms in a terminal, all remaining loading and unloading platforms in the terminal will be positioned in direct registry with one of the subsequent cars in the unit train. Preferably, the terminals will have a loading and unloading station for each car in the unit train, or the number of cars in the train will be a whole number multiple of the number of loading and unloading stations in the individual terminals.

In order to assure precise alignment of the loading and unloading stations with the cars along the length of the train, the individual cars are precision engineered to provide a fixed length for the trains. If necessary, means may be provided for compensating for minor variations in car length as might result, for example, from a large temperature variation.

Operation of the improved system according to the present invention contemplates the use of a computerized, systemwide reservation system, with all cars in each unit train always carrying either a loaded or empty freight container. When a unit train is positioned in a terminal, and assuming that the terminal has a loading and unloading station for each car in the unit train, the container-handling mechanism on the individual cars carrying a container to be discharged at the specific terminal will be actuated to automatically discharge the containers onto the adjacent unloading station at one side of the train. The container-handling mechanism will then continue to operate to load onto the empty cars from the loading station adjacent thereto either a loaded container to be shipped to another designation in the system, or an unloaded container which has been prepositioned on the loading platform before arrival of the unit train. The train may then proceed on schedule to the next terminal after only a very brief stop such as might be required to pick up and/or discharge passengers. In this regard, it is contemplated that the term "containers" shall include passenger compartments mounted on the standard car, although obviously it would be unnecessary to load and unload these passenger compartments at the main-line terminals. Further, the trains could include a number of passenger cars or more conventional design if desired.

Upon departure of the unit train from the terminal, the containers, whether full or empty, which were discharged from the train are then transferred to a queueing area from which they may be delivered to their ultimate destination, returned to a loading platform in the terminal for transshipment further in the system, or otherwise processed as necessary. Handling of the containers at the individual terminals may be accomplished by rail cars of the general type employed in the unit trains, including means for loading and unloading the containers, by motor trucks similarly equipped, or by other suitable means including lift trucks or the like.

BRIEF DESCRIPTION OF THE DRAWINGS

The foregoing and other objects and advantages of the present invention will become apparent from the following detailed description, taken in conjunction with the drawings, in which:

FIG. 2 is a fragmentary elevation view, partially in section, of a portion of the car shown in FIG. 1;

FIG. 3 is a fragmentary sectional view, taken on line 3—3 of FIG. 1;

FIG. 4 is a fragmentary sectional view, taken on line 4—4 of FIG. 1;

FIG. 5 is a fragmentary sectional view, in elevation, taken along line 5—5 of FIG. 1;

FIG. 6 is a fragmentary, top plan view, with certain elements broken away and others illustrated in phantom, of one end portion of the railway car shown in FIG. 1;

FIG. 7 is a fragmentary sectional view, taken on line 7—7 of FIG. 6;

FIG. 8 is a view similar to FIG. 6 and illustrating the opposite end of the railway car;

FIG. 9 is a fragmentary sectional view, taken on line 9—9 of FIG. 8;

FIG. 10 is a sectional view, in elevation, taken along line 10—10 of FIG. 9;

DESCRIPTION OF THE PREFERRED EMBODIMENTS

Figure 17:
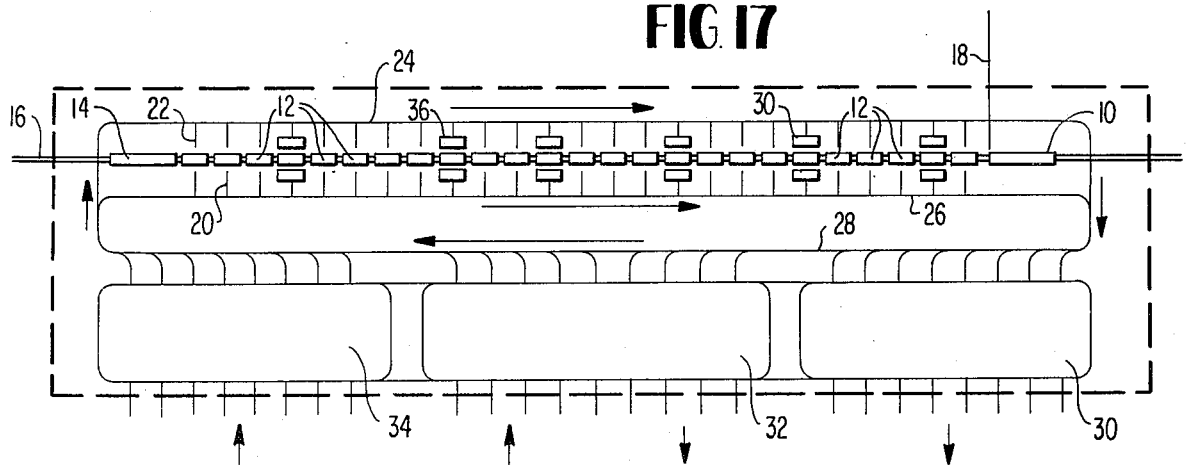
FIG. 17 is a top plan view schematically illustrating a complete terminal facility of the type shown in FIGS. 1 and 3.

Referring now to the drawings in detail, the general operation of the rail system according to the present invention is illustrated schematically in FIG. 17 wherein a unit train consisting of an engine 10, twenty-five rail cars 12 and a caboose 14 is positioned on railroad tracks or rails 16 in a terminal facility with the rear of the engine 10 being position in registry with a train locater or marker indicated by the arrow 18 to thereby position each of the rail cars in transverse registry one with each of a plurality of loading stations 20 aligned along one side of the tracks 14 and an equal number of unloading stations 22 aligned along the opposite side of the train. In FIG. 17, the loading and unloading stations are indicated only by a straight line representing the centerline of the individual stations, with the details of the loading stations described more fully hereinbelow with reference to other drawing figures.

A terminal rail track system, shown schematically in FIG. 17 by single line representation, includes a section 24 of track extending parallel to tracks 18 and outboard of the unloading stations 22, a second section 26 of track extending parallel to tracks 16 and outboard of the loading stations 20 and a third section 28 of track extending past incoming and outgoing queueing areas 30, 32, 34 for incoming and outgoing freight containers 36. Thus, loaded containers 36 arriving on the unit train and discharged onto the unloading stations 22 are picked up by a shuttle car operating on the terminal rail system and transferred to one of several queueing lanes in incoming queueing area 30 from which they may be dispatched in predetermined order. Similarly, loaded containers 36 originating at the terminal are assembled in the respective lanes of the outgoing queueing area 34 for dispatch according to predetermined schedule to one of the loading stations for subsequent automatic loading onto the unit train.

It is apparent that the containers 36 might be of any suitable standardized size. For example, the containers could be designed so that they could be handled individually by over-the-road trucks equipped to load and unload the containers from compatible docks or stations in the same manner as the rail cars.

The rail cars 12 are each of a generally flat-bed construction, and are illustrated in the drawings as consisting of a unitary rigid cast or forged body 40 having a top planar load bearing surface 42. It is understood, of course, that the body 40 may be of any suitable construction, such as of welded structural steel sections, a plurality of separately formed forgings or castings rigidly joined, or of multiple material construction. The cars are supported at each end by carriages which include an axle 44 and flanged wheels 46 for engaging the tracks 16. The carriages are of tandem construction, employing two axles and four wheels supported in tandem arrangement by a pair of frames 48 and journal boxes 50. The frames 48 support resilient springs 52 on the ends of carrier bars 54 of a pivoted bolster assembly (See FIG. 10).

As shown in FIG. 2, a hydraulic cylinder 58 is rigidly mounted, by guide bracket 60, on the underside of the rail car body 40 above the transverse centerline of each of the carriage frames 48, with a piston 62 extending downwardly from the cylinder 58 to engage the top surface of the tandem carriage frame 48. The fluid cylinder 58 may have a fixed stroke, with the piston 62 being of sufficient length to engage the top of the frame 48 and lift the car body 40 to a fixed, predetermined height above the level of the rails 16 regardless of the weight and distribution of the load carried by the individual cars. Alternatively, adjustable stops 64 may be mounted in the carriage frame 48 in position to engage the top surface of the support arms 54 to limit upward movement of the car by the action of the fluid cylinder 58 and piston 62. As shown in FIG. 3, the height of the car body 40, with the fluid cylinder 58 actuated, is such as to place the load bearing surface 42 of the rail car in horizontal alignment with the top surface of the floating platforms 66. The platforms 66 are mounted on top of fixed rigid docks 68 by wheels 70, with the top surface of the floating platforms 66 being a fixed, predetermined distance above the top surface of the rails 16. Wheels or rollers 70 are mounted for rotation about axes extending perpendicular to tracks 16 whereby movement of the platforms 66 is parallel to the tracks. This movement is limited by a plurality of heavy centering springs 71 positioned between the ends of the platform 66 and rigid abutments 73 on the docks 68. Thus, the floating platform 66 allows for slight longitudinal movement of container 36 in a direction parallel to track 16 if desired during the unload-load process to compensate for limited misalignment of rail car and dock.

Figure 1:
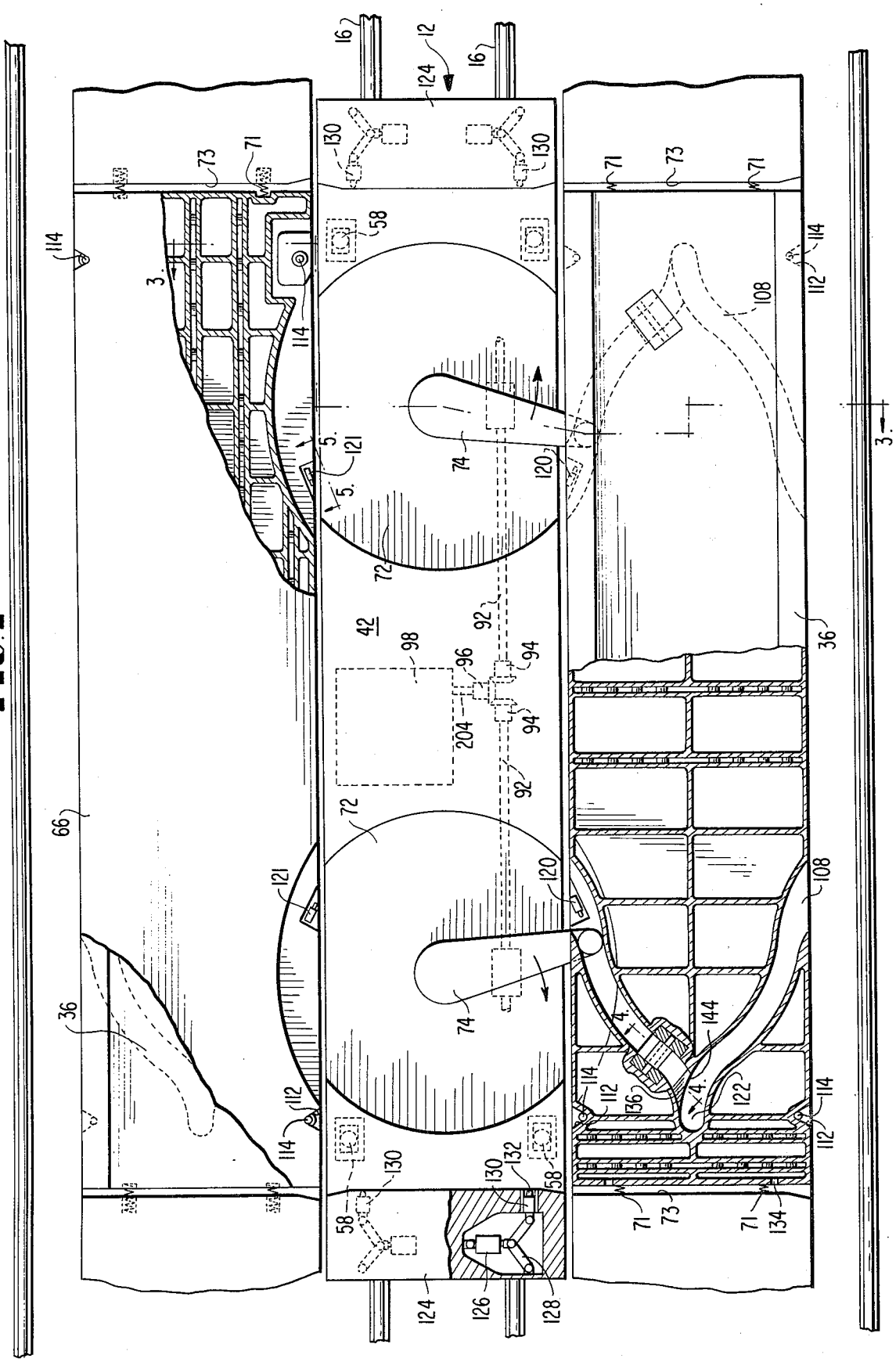
FIG. 1 is a top plan view, partially in phantom, and with certain elements broken away to more clearly illustrate other elements, of a railway car according to the present invention in position in a terminal and showing a container being loaded onto the car.

Referring to FIGS. 1 and 3, it is seen that there are two identical recesses 72 formed in the top surface 42 of the individual cars, with one recess being positioned adjacent each end of the car. A driven loading arm 74 is pivotally mounted within each of the recesses 72 for rotation in a horizontal plane about a vertical axis by a shaft 76 and journal bearing 78 supported within a boss 80 in the car body 40. The shafts 76 are located on the longitudinal centerline of the cars and are driven in synchronization with each other but in opposite directions through rotation about their vertical axes by worm gears 82, mounted by keys 84 and locking washers 86 on downwardly extending extensions 88 of the shafts 76. The respective worm gears 82 are driven by a worm 90 mounted on a longitudinally extending shaft 92, with the respective shafts 92 in turn being driven by beveled gears 94 mounted on their adjacent ends and engaging a bevel drive gear 96 of a variable speed drive mechanism 98 more fully described hereinbelow.

A cam follower roller 100 is rotatably mounted by shaft extension 102 and bearing 104 in an aperture in the distal ends of the respective arms 74. The cam follower rollers 100 project above the top load bearing surface 42 of the rail cars, with the arms 74 projecting above the top of the rigid docks 68 when the arms are projected laterally from the side of the car.

The freight containers 36, illustrated in FIGS. 3 and 14–16 in the form of pallets, are all formed with a standard base 106 having an upwardly extending cam groove 108 formed therein adjacent each end of the container in position to be engaged by the cam rollers 100 upon synchronized rotation of the loading arms 74 with said arms moving in opposite directions. As best seen in FIG. 1, the cam grooves 108 are of a generally wishbone configuration in their plan view, with the loading and unloading portions of the track diverging from a common centerline apex in a direction toward the transverse centerline of the car and outwardly to the side edges thereof. These cam grooves are adapted to receive the cam rollers 100 upon rotation of the loading arms 74, and cooperate therewith to laterally transfer a container 36 from a loading station 20 onto the load support suface 42 of the rail car as the roller 100 progresses along one arm of the cam groove 108. For unloading action, continued rotation of the loading arms 74 will then act on the other arms of the cam grooves to project the container 36 from the rail car onto the floating platform 66 at the unloading station 22. Cam grooves 108 are constructed to obtain mirror images of one another so that the noted synchronized rotation of arms 74 and rollers 100 moving in opposite directions and acting in cam grooves 108, will always restrain the container from longitudinal movement during lateral transfer from the rail car 40 to the unloading station 22 or from the loading station 20 to the rail car 40 thus producing a highly desirable controlled conditon during the transfer process. Loading arms 74 possess a radius sufficiently greater than one half the width of rail car 40 so that displacement of rollers 100 from cam grooves 108 during unloading operation will always result in depositing the container 36 on the unloading station 22 in the at-rest condition and completely free of rail car 40 and outside the path of train movement. In like manner, length of arm 74 is such that as arm 74 continues rotation after disengagement from container at unloading station 22 it enters cam groove 108 of container at loading station 20 on platform 66, with said container at rest and outside path of train movement. As rollers 100 contact cam grooves 108, lateral movement of container 36 begins slowly due to the gradual slope of cam groove during initial contact thus producing a very smooth low force movement at start of lateral transfer.

Figure 16:
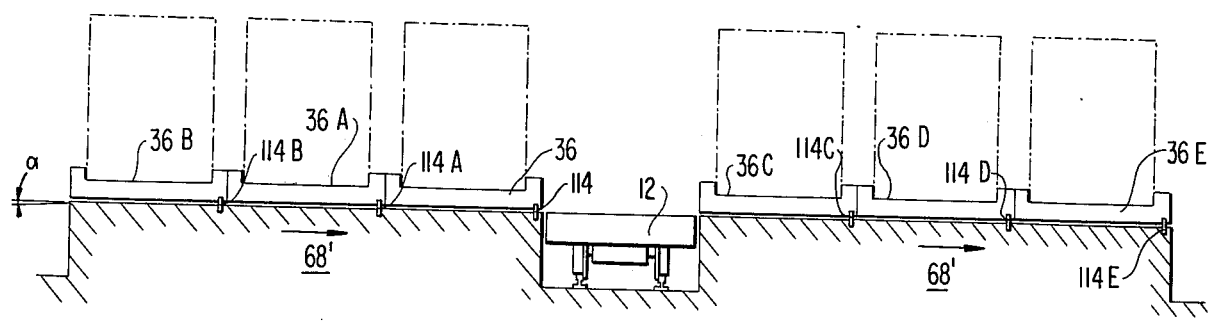
FIG. 16 is a view similar to FIGS. 14 and 15 and illustrating a further terminal arrangement.

As seen in FIG. 2, the containers 36 are each supported by a plurality of rollers 110 mounted for rotation about axes extending longitudinally of the respective containers. These rollers 110 are adapted to roll upon the top, generaly horizontal surface of the floating platforms 66 and on the load support surface 42 of the rail car to thereby reduce the force required to transfer the loaded container onto and off of the rail cars. Each container base 106 is formed with inwardly projecting V-notches 112 (FIG. 1), one in the side edge thereof adjacent each corner of the container, in position to engage a plurality of stop pins 114 supported on the end of a piston 116 actuated by a fluid cylinder 118 mounted below the top surface of the rigid dock 68. As shown in FIG. 3, movement of the piston will project the pin 114 above the top surface of the floating platform 66 to engage the V-notch in the side of the container adjacent the tracks 16 to prevent the container from rolling on the rollers 110 into the path of the rail cars 12. Pins 114 may also function as locating pins on load station 20 to place container 36 in alignment with rail cars. Preferably the top surface of the floating platforms is inclined at a very slight angle $\alpha$ as shown in FIG. 16 to assure that the containers 36 remain in contact with the pins 114. Retraction of the pins 114 permit the containers to be moved freely by the loading arm 74 and cam follower 100. The pins 114 at the loading stations are normally in the raised position and may be moved to the lowered position by a switch 120 mounted in position to be engaged and actuated by the loading arms 74 as the cam follower 100 enters the cam groove 108, thereby actuating the cylinder 118 and permitting a container 36 to be moved onto the rail car. The pins 114 at the unloading stations are normally in the lowered position and are actuated by similar cam switches 121 actuated by the loading arms 74 as the cam follower 100 exits the cam track after depositing the container 36 onto the unloading station, thus causing the pins 114 to extend upward into the V-notch 112 to prevent the unloaded container from re-entering the train path.

Referring to FIGS. 1 and 4, it is seen that, as the cam followers 100 enter the loading side of the cam tracks 108 and progress therein upon rotation of the loading arms 74, the container 36 will be progressively shifted laterally onto the surface 42 of rail car 12 until the cam followers 100 reach the centerline position 122, at which time the container will be exactly centered upon the rail car. Operation of the variable speed drive mechanism 98 stops at this point, leaving the cam follower engaging the cam track at the centerline position to retain the container against lateral and longitudinal movement. To further retain the container in position, a locking mechanism is provided on the rail car to positively interlock the container with rigid abutments 124 at each end of the rail car. These locking mechanisms each comprise a fluid cylinder 126 having its piston connected to a pair of lever arms 128 by suitable pivot pins as shown in FIG. 1. One of the levers 128 is pivotally connected to the rigid abutment portion 124 of body 40 while the other lever 128 is connected to one end of a piston 130. The piston 130 is mounted for sliding movement in a fore-and-aft direction and includes a reduced diameter portion 132 adapted to fit within an opening 134 to firmly lock the container 36 against lateral movement. The shoulder portion of the cylinder 130 at the juncture of the cylinder body and the reduced diameter portion 132 firmly engages the end of the container body to firmly lock the container against fore-and-aft movement.

Referring to FIG. 4, it is seen that, as cam follower 100 progresses through the loading side of cam track 108, the follower 100 will engage and pivot upwardly a deflector arm 136 mounted for pivotal movement about a horizontal axis by a shaft 138. The deflector arm 136 is biased downwardly into the path of the cam follower 100 by a resilient spring 140, and is deflected upwardly by the cam follower into a recess 142 as the loading arm 74 moves the cam follower therepast. The deflector arm 136 has a contoured vertical surface 144 conforming to the configuration of the cam track on the unload side thereof, with the surface 144 projecting down into the path of the cam follower upon rotation of the load arm 74 in a direction to move the container from the car onto the unloading station. Thus, the surface 144 is a movable cam surface which is deflected upwardly upon loading the container onto the rail car, but which acts as a cam surface to move the container laterally off of the rail car, thereby preventing the cam follower 100 from re-entering the loading side of the cam track to shift the container laterally back onto the loading station. While the movable cam surface is illustrated in one leg of the cam track 108, it is understood that similar movable cam track members might be used in both legs of the cam track, thereby enabling the containers to be either loaded or unloaded from either side, provided the two movable cam track members are interlocked in a manner to always leave the exit leg open.

As shown in FIGS. 6–10, the rail car 12 includes means for adjusting the overall length of the individual cars within the train, i.e., the length of the cars coupling-to-coupling with said couplings being of a no-slack type so that when rail car length is adjusted in relation to couplings, it is maintained throughout the entire train length relationship since no uncoupling is required during normal operation. This is accomplished by mounting one of the carriage assemblies for each car in fixed position to the underside of the car body 40 and attaching the other carriage through an adjustable mechanism operable to shift the point of attachment longitudinally of the car through a fixed distance. The fixed carriage has rigidly attached to the top of the bolster 56 (said bolster may include coupling assembly as shown or may not to suit car construction) a mounting flange assembly 143 having a plurality of elongated, fore-and-aft extending slots 145 formed therein for receiving attaching bolt 146 threaded into the base 40. Mounting flange 143 is formed with recessed ledges along its side edges for receiving an overlapping flange on mounting brackets 150 secured to the base 40 by bolts 152. Thus, the mounting flange 143 fits in tongue-and-groove relation with the mounting brackets 150 to retain the rail car to carriage in a centralized condition and to firmly clamp the mounting flange to the base and cooperate with the bolts 146 to carry the load on the carriage. The elongated slots 145 provide for minor adjustment in the position of the fixed carriage upon assembly of the individual cars, which adjustment should thereafter remain unchanged in normal use. The bolster 56 is secured to the mounting flange 42 by downwardly projecting pin 154 which permits the carriage to pivot in relation to rail car 40 and is retained by mounting washer 156 and screw 158.

The carriage at the opposite end of the car is also connected to the car by a mounting flange structure 160 supported for longitudinal sliding movement in tongue-and-groove arrangement by mounting brackets 162 which, in turn, are rigidly secured to the bottom surface of the body 40 in a manner similar to that described above with regard to the mounting brackets 150. Mounting flange 160 also incorporates a downwardly projecting pin 154 to permit the carriage to pivot in relation to the rail car 40 with pin 154 extending through and secured to the bolster by washer 156 and locking screw 158.

A cam groove 164 is formed in the top surface of mounted flange 160, with the groove 164 extending generally transversely of the car but inclined slightly in the fore-and- aft direction as most clearly seen in the phantom-line illustration in FIG. 8. A sliding block 166 is movably mounted in a transversely extending groove 168 in the bottom surface of the car body 40, with the block 166 having formed on its lower surface a downwardly projecting cam portion 170 fitting into the cam groove 164. A threaded aperture 172 formed in the block 166 receives a threaded shaft 174 which, in turn, is journalled for rotation about its longitudinal axis by brackets 176 and retained against longitudinal movement by bearing plates 178. A worm gear 180 is mounted, as by key 182, on the shaft 174 between the bracket members 176, and a worm 184 mounted on a shaft 186 drives the worm gear 180 to move the block 166 transversely of the car within the groove 168. Transverse movement of the block 166, acting through the cam portion 170 and the cam track 164, moves the mounting flange 160, and the bolster assembly 56 supported thereon, forward or rearward on the car.

The worm 184 and shaft 186 are driven in rotation by a suitable electric motor 188 possessing reversing capability and reduction gear assembly 190 mounted on the bottom surface of the car body. By using a very high reduction through the reduction gear mechanism 190, the worm and worm gear 184, 180, the threaded screw shaft 174, and the inclined cam groove 164, a large force is generated so as to shift the position of the bolster relative to the car and thereby adjust the length of the car within a unit train. Thus a very high precision adjustment is obtained whereby each revolution of the worm shaft 186 produces a small longitudinal movement of flange 160 and bolster 56 in relation to car body 40 enabling each car of the unit train to be precision adjusted to maintain exact alignment with dock load stations 20 and unload stations 22. Control of the motor 188 may be either manual or automatic as desired, with automatic control being preferred to compensate for variations in train length which might result from extreme temperature changes or the like. By maintaining the train length within fixed limits, accurate alignment of the cars with the loading and unloading station in a terminal is assured once the train is accurately positioned with respect to the index position in a terminal.

Figure 11:
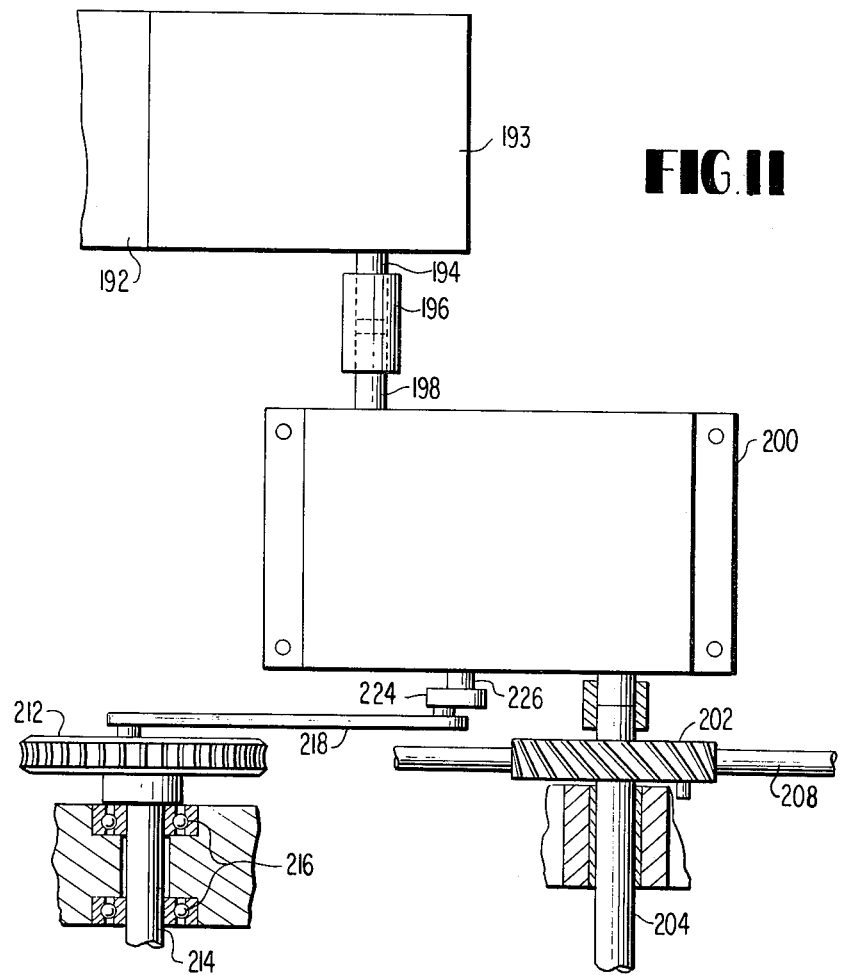
FIG. 11 is a schematic illustration in plan view, of the variable speed drive mechanism for the loading and unloading mechanism employed on the rail cars.
Figure 12:
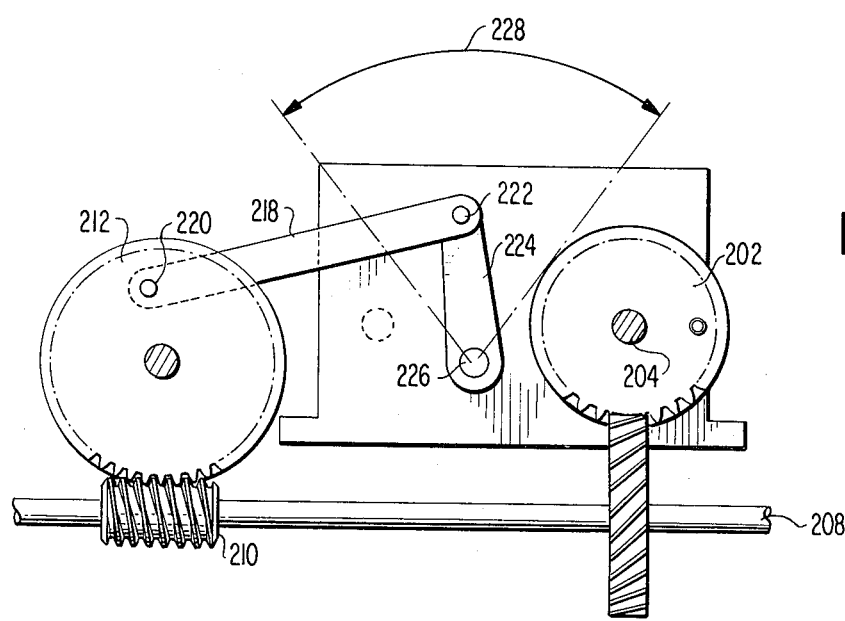
FIG. 12 is a schematic illustration, in elevation, of the mechanism shown in FIG. 11.

Referring now to FIGS. 11 and 12, the unloading and loading drive mechanism 98 is illustrated as including an electric motor 192 driving a fixed reduction gear assembly 193 having its output shaft 194 connected, by suitable flexible coupling 196 to the input shaft 198 of a variable speed drive mechanism 200. The variable speed drive mechanism 200 may be a commercially available variable speed drive such as the well-known Zero-Max or other suitable mechanical drive modified to vary the speed reduction through a complete cycle in a closed loop effect from minimum to maximum and back to minimum upon each cycle of operation of the loading and unloading mechanism of the rail cars. This may be accomplished by mounting a helical gear 202 on the output shaft 204 of the variable speed drive, with the helical gear 202 meshing with the helical gear 206 mounted on a control shaft 208 extending at right angles to the output shaft 204. A worm 210 mounted on the shaft 208 engages and drives a worm gear 212 supported on a stub shaft 214 by bearings 216 for rotation about an axis parallel to the output shaft 204. A connecting rod 218 has one end pivotally connected, as by pin 220, to the worm gear 212 and its other end pivotally connected by pin 222 to the end of a crank 224. The crank 224 is mounted on the speed control shaft 226 for movement through an arc indicated by the arrow 228 from a starting position in which the variable speed drive produces minimum output velocity to a second position producing maximum output velocity. By varying the output shaft 204 velocity from a minimum condition to a maximum condition, it is possible to control the speed of rotation of loading arms 74 so as to best achieve an optimized operating condition which produces minimum speed when the container 36 is positioned centrally on the rail car body 40 as motion of the arms 74 ceases. Thus the start-stop acceleration-deceleration inertia forces are minimized due to a gradual slowing of the loading arms 74 as the stop position is approached and a gradual starting of loading arm motion as the unloading cycle begins. This variable speed effect allows maximum velocity to be reached when no work is being performed, namely during the idle period of the loading arms 74 which occurs 180° from the start-stop or minimum speed position. The idle period starts after the loading arms 74 have disengaged the cam grooves 180 in a container at the unload station 22 and continues until engagement of the cam grooves 180 of a second container at the load stations 20.

Figure 13:
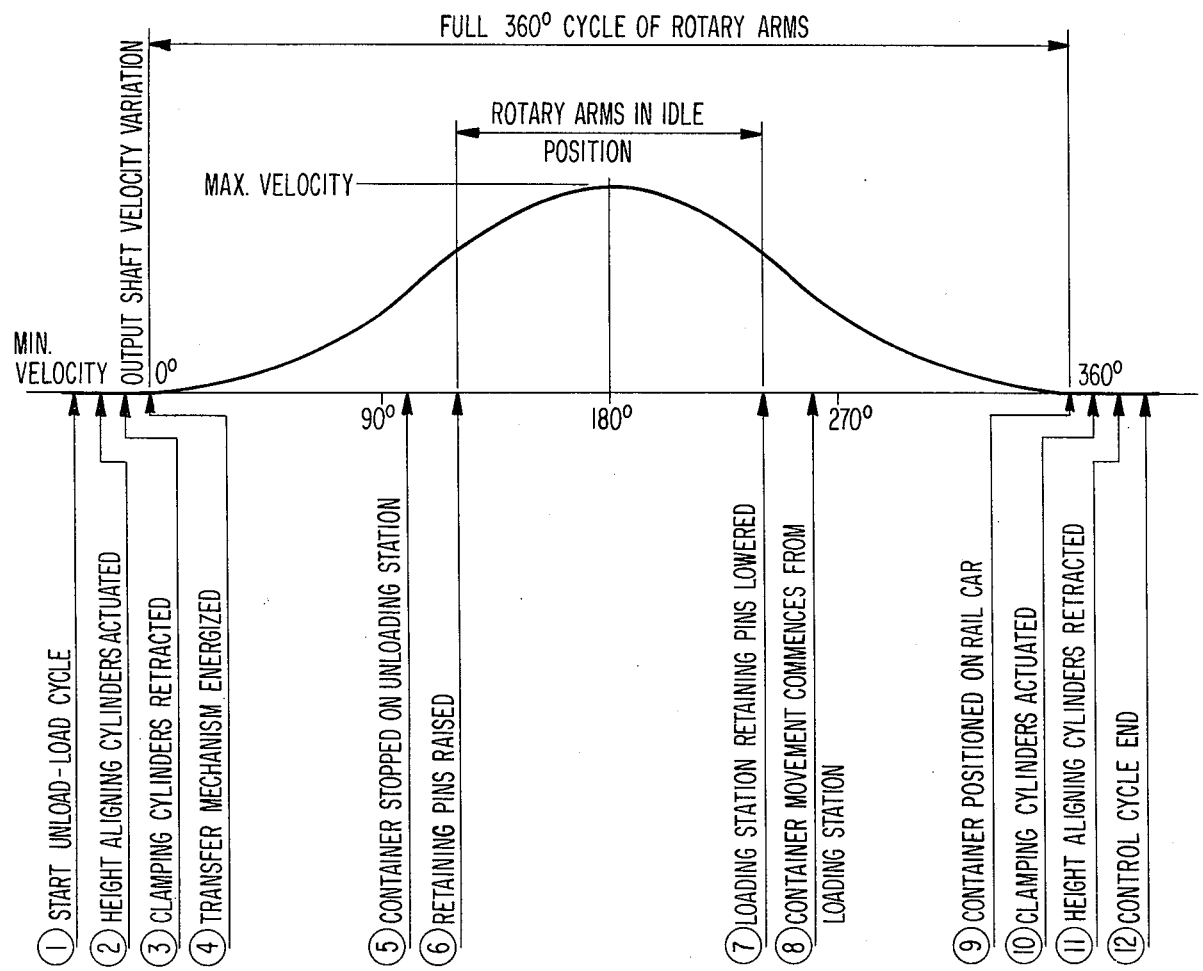
FIG. 13 is a curve showing the variations in velocity of the loading mechanism during a complete unloading and loading cycle.

The curve in FIG. 13 represents the variations in speed of the output shaft in movement of the loading and unloading arm through a complete circle starting from the position with a container loaded on the rail car and moving through the unloading cycle, the idle position of the arm as it moves from the unloading position to the loading position and return to the starting position with the second container loaded on the rail car. In addition, FIG. 13 shows a typical full-time cycle of the unloading and loading operation, including time for unclamping the clamping devices 126 and continuing to the position in which the clamps are returned to clamp the second container on the rail car. As seen in FIG. 1, the bevel gear 96 is mounted on the end of output shaft 204 to drive the shafts 92 to rotate the loading arms 74 in synchronized but opposite directions. The complete time cycle for the loading and unloading operation necessarily includes the time required to accurately position the train in the terminal, starting the cycle to energize the height aligning mechanism, unlock the containers to be discharged from any car in accordance with the programmed schedule, energize the loading and unloading mechanism to rotate the drive arms 74 through one complete revolution to unload a container onto the adjacent unloading station, lock it in position by actuation of the switch 121, unlock the container to be loaded by actuation of the switch 120, and to shift the container to be loaded onto the car. Thereafter the locking mechanisms 126 are energized, the height aligning mechanism released, and the cycle is complete, with the train ready to move from the terminal. As an alternative drive system arrangement, the variable speed drive input shaft 198 can be connected directly to the motor 192 with reduction gear unit 193 so placed as to be driven by variable speed output shaft 204 instead of driving input shaft 198. With such an arrangement, reduction unit output shaft 194 is connected to bevel gear 96 which in turn drives bevel gears 94 and shafts 92 and loading arms 74 through worm 90 and worm gear 82 and results in a reduced torque (power) input required to drive said mechanisms and loading arms 74.

Figure 14:
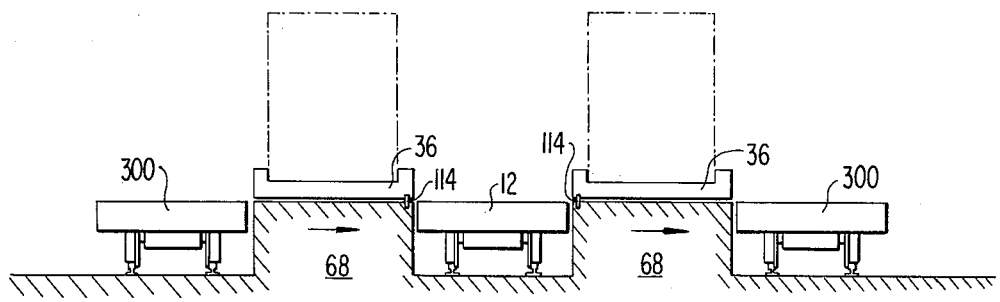
FIG. 14 is a schematic illustration, in elevation, of a railroad terminal employed in the system of the present invention.
Figure 15:
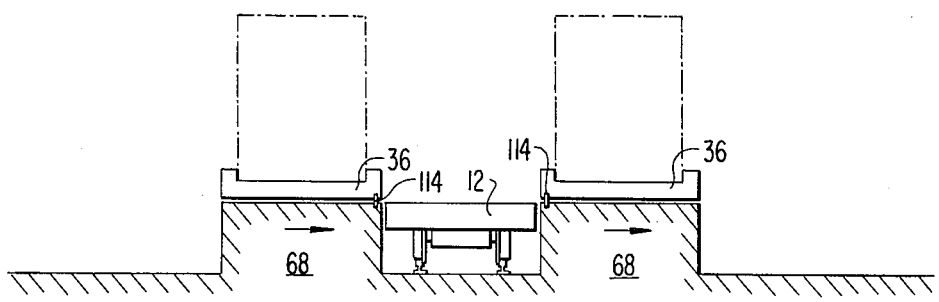
FIG. 15 is a schematic illustration, similar to FIG. 14 and illustrating a further terminal arrangement.

FIGS. 14, 15 and 16 illustrate variations in terminal arrangements which may be employed in accordance with the present invention. Thus, FIG. 14 schematically illustrates what might be termed an intermediate size terminal including a loading dock 68 capable of handling only a single container 36 at each loading station and a single container at each unloading station. Such an intermediate station would, however, include a terminal track network for handling shuttle cars 300 for moving the containers 36 between the loading and unloading stations at the terminal and queueing stations removed from the main terminal.

FIG. 15 illustrates a terminal arrangement similar to that shown in FIG. 14, but without the terminal track network for handling shuttle cars. In such a simplified terminal to be used at minor cities or freight handling locations, the containers 36 could be handled by suitable means such as motor trucks or by motor driven lift trucks adapted to lift and transport the individual containes 36.

FIG. 16 illustrates a dock system of the type contemplated for major freight handling terminals. In this arrangement, the docks are adapted to accumulate a number of freight containers at each loading and unloading station in order to facilitate movement of the trains during peak traffic periods. Thus, the individual containers 36 are positioned on the loading dock in accordance with the predetermined reservation schedule, with successive containers then being loaded onto the appropriate car of successive unit trains stopping in the terminal. This arrangement would eliminate any delay which might be encountered as a result of the terminal facilities being unable to stock the loading docks as fast as the trains remove the containers from the loading platforms during peak periods.

As shown in FIG. 16, the docks 68 may be inclined slightly to permit containers 36 to move due to gravity in the direction shown with a plurality of stop pins 114 located as shown to stop containers from moving beyond the desired position. Stop pin retraction and extension are sequenced by a suitable control system so that cycling of loading arms 74 trip switches 120 in cam grooves 108 of container 36 to cause stop pins 114 to retract allowing container 36 to move laterally onto rail car 12 as previously discussed. Stop pins 114A for container 36A and stop pins 114B for container 36B remain extended however until stop pins 114 are again extended due to action of additional switches 120 at exit path of cam groove 108 (not shown) or other suitable electrical sequencing controls. As stop pins 114 are extended stop pins 114A are retracted allowing stop pins 114 to stop container 36A as it moves one position due to gravity action. Stop pins 114A then extend in sequence as stop pins 114B are retracted allowing container 36B to move due to gravity action to that vacated position only to be stopped by pins 114A. Through such a sequencing arrangement any number of positions can be utilized as desired with each container moving in sequence as noted. In like manner the unload dock 68' may also be sequenced so that multiple containers can be accommodated as described above for the load dock 68' except that container 36E must be transferred off unload dock first so as to vacate that position to permit transfer of 36D and 36C each one position thus freeing up the unload dock adjacent to the rail car 12 to permit acceptance of next train container to be unloaded.

Operation of the rail system in accordace with the present invention results in a significantly different operating system when compared to conventional systems. Said conventional systems today do not possess lateral transfer means to both load and unload freight from individual rail cars by predetermined selection under automatic or manual control. State of the art material handling systems do utilize lateral transfer means for such systems as mechanized parking garages and the like. However, such known systems do not provide the specific features embodied in this invention as they relate to rail system operation and furthermore do not possess the advantages inherent in the load-unload transfer mechanism described herein. These advantages include a one cycle operation of dual loading arms by which a container may be off-loaded from a rail car, deposited free and clear of rail car or an unload dock at one side of the car, and through continued movement of loading arms in the same 360° cycle, pick up a container from the load dock on the other side of the car and laterally transfer it to an exact central position on the rail car both laterally and longitudinally, as the cycle is completed, at which point said container can be automatically locked on the rail car.

The single cycle operation which loads and unloads in the same cycle is made possible in the present invention by the unique dual and mirror-imaged cam grooves which provide ease of exit of cam rollers to place the unloaded container in an at-rest condition at the time of disengagement, ease of entry into the same cam grooves (on another container) due to the cam curvature to pick up the container to start lateral transfer, prevention of longitudinal movement during said lateral transfer due to cam grooves being opposed one to the other thus limiting such longitudinal movement, greater stability and control of container during lateral transfer due to outward and opposed placement of cam grooves so that the dual cam rollers always oppose one another due to each moving in opposite directions, precise positioning in the before mentioned centralized condition on the rail car both laterally as well as longitudinally due to the center position of said cam grooves being in exact proximity with cam rollers in both lateral and longitudinal directions at cycle end without need for supplementary transverse tracking means to obtain said precision orientation of the container on the rail car so as to allow for subsequent locking of container to rail car by clamping means previously described. This system accomplishes lateral transfer with individual loading arms possessing only a single roller each as compared to existing state of art systems which generally utilize two rollers on each rotating arm which generaly act in straight tracks for roller contact running parallel to the docks and/or transfer vehicle thus not possessing longitudinal movement restrictions when the rollers act in said tracks. This in turn requires such prior systems to employ supplementary means to track the pallet or container during lateral transfer to prevent longitudinal movement. Further, existing material handling systems also generally cannot accommodate a complete transfer of unload to unload stations, pick up load, position and lock in a single cycle operation as previously described and embodied in this invention. Thus this system presents an advantageous feature in this regard which accomplishes a very complex function with a relatively simple mechanism in a single cycle operation of 360° as opposed to existing systems which have either high complexity, multiple cycles and/or discontinuous movement cycles for accomplishing specific functions provided for in this invention, lack the provisions for unload and load in the same cycle as contained in this invention, or possess other limitations which restrict their applicability to high load movements such as required in rail system operations of the type described in this invention. Another advantage of the cam groove design is that suitable entry leads can be provided for initial roller entry contact in the grooves to compensate for any slight misalignment between a rail car and the adjacent dock while still retaining the precision positioning capability in the central position of the rail car as previously noted.

The invention employs a variable speed drive system which drives the loading arms through their operating cycle in a controlled movement which produces a slowing or braking effect as the central position is approached on the rail car during loading, and a slow start movement away from the central position when unload cycle is begun, thus minimizing the effects of inertia forces present in heavy load rail operations as envisioned in this application. Thus this variable speed cycle combined with the unique cam groove entry, exit and positioning capability combine to provide a highly desirable transfer mechanism for intended lateral transfer of rail freight or other appropriate applications.

The precision aligning capability embodied in this invention enables the plurality of rail cars in the unit train to each be aligned with their respective unloading and loading docks in a vertical height and longitudinal direction with the degree of precision required to permit proper functioning of the load-unload mechanism as previously described.

The rail system in accordance with the present invention eliminates many of the disadvantages of conventional rail systems which have resulted in many of the difficulties discussed above and now faced by such conventional rail systems. Thus, the ever-present problem of damage to freight resulting from humping of cars in switching yards is completely eliminated since switching yards, themselves, have been eliminated. Instead, the standardized containers are handled on an individual basis in shifting between terminals and queueing areas. The loading and unloading mechanisms are smooth operating, eliminating any sudden jarring or movement of the containers which could result in damage to the contents.

Elimination of the switching yards eliminates a further disadvantage of conventional systems in that the enormous capital investment of rail cars normally inactive in switching yards is completely eliminated. Instead, each terminal is supplied with the required number of standardized containers to maintain a smooth flow of freight through the queueing areas and terminal. Each time a container is shipped from a terminal, another container, either filled or empty, is left at the terminal by the unit train. Since standardized containers are employed, queueing areas may be equipped with modern material handling facilities and methods to facilitate the handling and packing of freight in the containers. For example, it is contemplated that the containers may be employed for the transportation of automobiles as from a manufacturing area or between major terminals as wherein a passenger wishes to take his motor vehicle along on his train trip. In such cases, it is contemplated that the motor vehicles may be driven from elevated ramps directly into the containers at a queueing station, with the filled containers then moving into position for dispatch to the loading platform in accordance with the container's schedule in the overall operating program.

Perhaps the greatest advantage of the rail system according to the present invention is the use of unit trains operating over a fixed or predetermined route in accordance with a fixed schedule, thereby enabling the handling of all freight containers on an express basis between terminal points as a reservation passenger. By interconnecting the overall system through computers, information regarding any container to be shipped is fed to the computer to assure the reservation of a rail car on the next available train. The computer then will advise the originating terminal of the loading station on which the outgoing container is to be positioned in order to be picked up when the scheduled train arrives.

It is recognized that many factors may affect the positioning of individual cars in a train relative to the adjacent loading and unloading stations regardless of the accuracy in the positioning of the index car. Thus, for example, an extreme change in temperature as might be encountered by trains operating on a north-south route can affect the overall length of the individual cars, which overall length is accumulative in the train. To compensate for minor misalignments, the floating platform at the loading and unloading stations can readily shift longitudinally of the train upon engagement of the loading arms in the cam track to move a container onto the car or upon shifting of a container onto an unloading platform. However, greater errors are readily compensated for by the car length adjusting mechanism described above, with the result that the positioning of a single car in a terminal relative to its adjacent loading and unloading station assures that all loading and unloading stations will be accurately aligned within the necessary limits, with each car in the unit train. Such capability reduces the need for floating platform 66, however, it is understood that the system could be planned to incorporate either or both of these aligning enhancements. This enables simultaneous loading and unloading of multiple cars in the train which can easily be accomplished within a time frame less than that normally required for picking up and discharging passengers. Thus, a plurality of cars along the length of the train may be unloaded and reloaded without the necessity of uncoupling the train and without delaying the train's departure for the next terminal.

While I have disclosed and described preferred embodiments of my invention, I wish it understood that I do not intend to be restricted solely thereto, but that I do intend to include all embodiments thereof which would be apparent to one skilled in the art and which come within the spirit and scope of my invention.

I claim:

1. For use in a railway transportation system for moving containerized freight between terminals along a railroad and for handling the containers at the terminals, at least one rail car for movement along the railroad, at least one loading and unloading station arranged on opposite sides of and adjacent to the railroad at the terminals and a plurality of freight containers adapted to be transported by said rail cars and to be transferred laterally from said loading stations onto said cars and from said cars onto said unloading stations when a train is located at a terminal with a car positioned adjacent the respective loading and unloading stations, the improvement wherein said at least one rail car comprises driven container transfer means operable when positioned in the terminal to engage and cooperate with one of said freight containers positioned on the car to laterally transfer the container onto an adjacent unloading station and to transfer a container laterally from an adjacent loading station onto said car for movement therewith, said driven transfer means including a cam follower, driven support means mounting said cam follower for rotation about a substantially vertical axis in an endless path extending across and projecting laterally from each side of the rail car, said containers each comprising a base, cam track means on the base and extending in a contoured path across the full width thereof and terminating in an open end at each side of the container, means operable to drive said support means and said cam follower mounted thereon about said path to engage said cam follower with one open end of said cam track of a container positioned on an adjacent loading station when the train is positioned in a terminal and to cooperate with said cam track to laterally transfer the container onto the car and to transfer a container from a car onto an adjacent loading station, and retaining means on said car operable to releasably retain said containers on said car for movement therewith.

2. The improvement as defined in claim 1 wherein said retaining means comprises said cam follower engaging said cam track, said means operable to drive said support means and said cam follower including means firmly locking said support means against movement.

3. The impovement as defined in claim 2 further comprising supplemental movable means on said rail cars for engaging and firmly interlocking a rail car and a container positioned thereon.

4. The invention as defined in claim 1 wherein said driven transfer means comprises a pair of cam followers mounted for rotation about vertical axes spaced from one another along said car and substantially on the longitudinal centerline thereof, said containers each including a pair of cam tracks in their base in position to be engaged one by each of said cam followers, said cam tracks being contoured and arranged in substantially mirror-image relation to one another and being spaced farthest apart at their central points arranged substantially on the longitudinal centerline of the container base.

5. The invention as defined in claim 4 wherein each of said cam tracks in each said container base have two diverging portions extending from said central points and terminating at the sides of said container base with the two portions of each track being substantially mirror images of one another along said longitudinal centerline of the container.

6. The invention as defined in claim 5 wherein said cam tracks are adapted to closely engage said cam follower means at said central points to accurately position a container both longitudinally and transversely on said rail car when said central points are disposed on the longitudinal centerline of a rail car.

7. The invention as defined in claim 4 wherein said drive means includes variable speed means operable to drive said cam followers in synchronization and in opposite directions about their respective vertical axes in an endless path.

8. The invention as defined in claim 7 wherein said drive means includes means for rotating said cam followers through one complete revolution at variable speeds commencing at a minimum speed and increasing through 180° of rotation and then decreasing in speed through the remaining 180° of rotation.

9. The invention as defined in claim 8 wherein said cam followers cooperate with said cam tracks to unload a container from said rail car only during the initial portion of said revolution, said initial portion consisting of substantially less than 180° and wherein said cam followers cooperate with said cam track means to load a container onto said rail car only during a substantially equal portion of said one complete revolution at the completion thereof, whereby said cam followers are driven in an idle condition during the maximum speed portion of said one complete revolution.

10. The invention as defined in claim 9 wherein said cam tracks are contoured to produce very slow movement of a container being unloaded from said rail car as said cam followers disengage said cam tracks and very slow movement of a container being loaded onto said rail car as said cam followers engage said cam tracks.

11. The invention as defined in claim 1 wherein said rail cars each comprise means operable to adjust the height of the cars to compensate for variations in loads on the respective cars to thereby position the cars at a predetermined height relative to said loading and unloading stations.

12. The invention as defined in claim 11 wherein said means for adjusting the height of said rail cars comprises a plurality of fluid cylinders having fixed strokes and operable to raise the level of the rail car to a fixed height about the railroad.

13. The invention as defined in claim 1 comprising a plurality of said rail cars coupled together to form a train, and means carried by at least selected ones of the cars in each said train for adjusting the length of the cars and thereby the length of the train whereby a plurality of said cars may be simultaneously accurately positioned relative to a series of loading and unloading stations arranged in a terminal.

14. The invention as defined in claim 13 comprising means for adjusting the length of each car in said train.

15. The invention as defined in claim 13 wherein said means for adjusting the length of said cars comprises motor driven means for shifting the point of connection of a car to an adjacent car in the train longitudinally of the car.

16. The invention as defined in clam 1 wherein said loading stations and said unloading stations each comprise a movable platform having a horizontal load support surface supported for limited longitudinal movement in a direction parallel to said railroad to accommodate slight misalignment between the adjacent rail car and said platforms during movement of a container therebetween.

17. The invention as defined in claim 16 wherein said movable platforms comprise roller means for supporting the platform on a fixed support surface for limited rolling movement parallel to said railroad, and resilient means urging said movable platform to a centered position, said resilient means being deformable to permit said limited movement.

18. The invention as defined in claim 17 further comprising retractable stop means for engaging said movable platforms to releasably retain said platforms in said centered position.

19. The invention as defined in claim 18 wherein said retractable stop means comprises means projecting above said substantially horizontal load support surface for engaging a container supported thereon to prevent movement of said container into the path of said train, said stop means being retractable to simultaneously release said containers for movement over said support surface in a direction perpendicular to said railroad and releasing said movable platform for movement parallel to said railroad.

20. The invention as defined in claim 1 wherein said containers further comprise roller means supporting said container for movement over a horizontal surface to reduce the force required to transfer said containers between said rail car and said unloading and loading stations.

21. A railroad transportation system comprising a railroad network having a plurality of freight terminals spaced therealong, trains operating on said railroad for transporting freight between said terminals, said trains being made up of a fixed number of uniform rail cars coupled together for operation as a unit of predetermined length, a plurality of loading platforms extending along one side and an equal plurality of unloading platforms along the other side of said railroad at said freight terminals, said loading and unloading platforms being arranged in opposed pairs at intervals corresponding to the spacing of said rail cars in said unit trains, a plurality of freight containers adapted to be carried by said rail cars, said containers each having a base, cam track means on said base and extending in a contoured path across the full width thereof, said rail cars each including driven load transfer means operable to engage and cooperate with a first freight container positioned on the car to laterally move said first container onto an adjacent unloading platform when the train is positioned within the terminal with said cars adjacent to and in registry with said pairs of loading and unloading stations and to engage a second container positioned on the adjacent loading station and laterally move said second container onto the car, said driven transfer means including cam follower means and means driving said cam follower means about a fixed path extending laterally from each side of said rail car to engage and cooperate with said contoured cam track means on and extending across the bottom of said containers to thereby laterally transfer the containers.

22. The invention as defined in claim 21 wherein said system further comprises a terminal track system at at least selected ones of said terminals, said terminal track system including portions extending along said loading and said unloading stations on the sides thereof opposite said railroad and connected to a further track portion extending to a container queueing area remote from the terminal, and rail cars including said driven transfer means movable on said terminal track system for moving containers between said loading stations, said unloading stations, and said queueing area.

23. The invention as defined in claim 22 wherein said rail cars each comprise means operable to adjust the height of the respective rail cars to compensate for variations in loads on the respective cars to thereby position the cars at a predetermined height relative to said loading and unloading stations.

24. The invention as defined in claim 23 further comprising means for adjusting the length of at least selected ones of said rail cars in each said train to thereby adjust the overall length of the train to enable accurate positioning of a rail car in a unit train in registry with each of a series of said loading and unloading stations at said terminals.

25. The invention as defined in claim 24 wherein said driven transfer means comprises a pair of cam followers mounted for rotation about vertical axes spaced from one another along said cars and substantially on the longitudinal centerline thereof, and wherein said cam track means comprises a pair of cam tracks formed in and extending across said base of said containers in position to receive and cooperate with said cam followers, said cam tracks being contoured and arranged in opposed substantially mirror-image relation to one another and each having two diverging portions extending from central points arranged substantially on the longitudinal centerline of the container base and terminating at the sides of said container base with the two portions of each track being substantially mirror images of one another along the longitudinal centerline of the container.

26. The invention as defined in claim 21 wherein said loading stations and said unloading stations each comprise a movable platform having a horizontal load support surface supported for limited longitudinal movement in a direction parallel to said railroad to accommodate slight misalignment between the adjacent rail car and said platforms during movement of a container therebetween.

27. The invention as defined in claim 21 wherein said driven cam means comprises a pair of cam followers mounted for rotation about vertical axes spaced from one another along said car and substantially on the longitudinal centerline thereof, and wherein said cam track means comprises a pair of cam tracks contoured and arranged in substantially mirror-image relation to one another and being spaced farthest apart at their central points arranged substantially on the longitudinal centerline of the container base.

28. The invention as defined in claim 27 wherein each of said cam tracks in said container base have two diverging portions extending from said central points and terminating at the opposite sides of said container base with the two portions of each track being substantially mirror images of one another along said longitudinal centerline of the container.

29. The invention as defined in claim 28 wherein said cam tracks are dimensioned to closely engage said cam follower means at said central points to accurately position and lack a container both longitudinally and transversely on said rail cars when said central points are disposed on the longitudinal centerline of the rail cars.

30. The invention as defined in claim 29 further comprising supplemental movable means on said rail cars for engaging and firmly interlocking a rail car and a container positioned thereon to positively prevent relative movement therebetween during movement of the train between terminals.

31. The invention as defined in claim 29 wherein said drive means includes variable speed means operable to drive said cam followers in synchronization and in the opposite directions of rotation about their respective vertical axes.

32. The invention as defined in claim 31 wherein said drive means includes means for rotating said cam followers through one complete revolution at variable speeds commencing at a minimum speed and increasing through 180° of rotation and then decreasing in speed through the remaining 180° of rotation, said cam followers cooperating with said cam tracks to unload a container from said rail car only during the initial portion of said revolution, said initial portion consisting of substantially less than 180° of rotation, and said cam followers cooperating with said cam track means to load a container onto said rail car only during a substantially equal portion of said one complete revolution at the completion thereof whereby said cam followers are driven in an idle condition during the maximum speed portion of said one complete revolution.

33. The invention as defined in claim 21 wherein said rail cars each comprise means operable to adjust the height of the rail cars to compensate for variations in load on the respective cars to thereby position the cars at a predetermined height relative to said loading and unloading stations.

34. The invention as defined in claim 21 further comprising means carried by at least selected ones of said rail cars in each said train for adjusting the length of the cars and thereby the length of the train whereby a plurality of said cars may be simultaneously accurately positioned relative to a series of loading and unloading stations arranged in a terminal.

35. The invention as defined in claim 21 further comprising means carried by each of said rail cars for adjusting the length of the cars and thereby the length of the train whereby a plurality of said cars may be simultaneously accurately positioned relative to a series of loading and unloading stations arranged in a terminal.

36. The invention as defined in claim 35 wherein said means for adjusting the length of said cars comprises motor driven means for shifting longitudinally of the car the point of connection of the respective cars to an adjacent car in the train.

37. The invention as defined in claim 21 wherein said loading stations and said unloading stations each comprise a movable platform having a horizontal load support surface, and means supporting said movable platforms for limited longitudinal movement in a direction parallel to said railroad to accomodate slight misalignment between adjacent rail cars and movable platforms during movement of a container therebetween.

38. The invention as defined in claim 37 wherein said movable platforms comprise roller means for supporting the platform on a fixed support surface for limited rolling movement parallel to said railroad, and resilient means urging said movable platform to a centered position, said resilient means being deformable to permit said limited movement.

39. The invention as defined in claim 38 further comprising retractable stop means for engaging said movable platforms to releasably retain said platforms in said centered position.

40. The invention as defined in claim 21 wherein said containers further comprise roller means for supporting the container for movement over a horizontal surface to reduce the force required to transfer said containers between said rail cars and said loading and unloading stations.

41. The invention as defined in claim 21 wherein said cam track is contoured to bring said container to an at-rest condition on said unloading station at the point of departure of said cam follower therefrom.

42. The invention as defined in claim 21 wherein said driven transfer means on the respective cars in a unit train are operable selectively and independently of the operation of the driven transfer means on the other cars in the train, whereby any one or number of said transfer means may be operated at a given time.

* * * * *